United States Patent
Ho

(10) Patent No.: US 6,913,378 B2
(45) Date of Patent: Jul. 5, 2005

(54) DIRECT-LIGHTING TYPE BACK LIGHT UNIT

(75) Inventor: Yi-Chun Ho, Chung-Ho (TW)

(73) Assignee: Quanta Display Incorporation, Taipei (TW)

( * ) Notice: Subject to any disclaimer, the term of this patent is extended or adjusted under 35 U.S.C. 154(b) by 13 days.

(21) Appl. No.: 10/330,593

(22) Filed: Dec. 27, 2002

(65) Prior Publication Data

US 2004/0125615 A1 Jul. 1, 2004

(51) Int. Cl.[7] ............................................... F21V 7/09
(52) U.S. Cl. ..................... 362/560; 362/297; 362/346; 362/327
(58) Field of Search ................................. 362/216, 247, 362/225, 296, 330, 560, 558, 297, 300, 327, 347, 346

(56) References Cited

U.S. PATENT DOCUMENTS

| | | | | |
|---|---|---|---|---|
| 5,479,328 A | * | 12/1995 | Lee et al. ................... | 362/216 |
| 5,499,165 A | * | 3/1996 | Holmes, Jr. .................. | 362/31 |
| 5,871,273 A | * | 2/1999 | Shaw ......................... | 362/247 |
| 6,467,933 B2 | * | 10/2002 | Baar .......................... | 362/260 |
| 6,692,137 B2 | * | 2/2004 | Blanchard .................... | 362/241 |
| 6,722,777 B2 | * | 4/2004 | Erber ......................... | 362/518 |
| 2002/0039292 A1 | * | 4/2002 | Matsui ....................... | 362/297 |
| 2004/0114366 A1 | * | 6/2004 | Smith et al. ................. | 362/247 |

* cited by examiner

Primary Examiner—Y. My Quach-Lee
Assistant Examiner—Peggy A. Neils

(57) ABSTRACT

A direct-lighting type back light unit includes a plurality of light sources for emitting light outward; a reflecting plate defining a plurality of curved reflecting recesses in which the light sources are respectively arranged. Each recess forms a first convex reflecting surface at a center of the recess, a second inclined reflecting surface formed at an edge of the recess and a third inclined reflecting surface formed at the edge and extending from the second reflecting surface.

21 Claims, 9 Drawing Sheets

DIRECT-LIGHTING TYPE BACK LIGHT UNIT

FIELD OF THE INVENTION

The present invention relates to a direct-lighting type back light unit for liquid crystal display (LCD) device, more particularly to a direct-lighting type back light unit having a reflector with a plurality of light sources and a plurality of reflecting surfaces corresponding to the number of the light sources.

BACKGROUND OF THE INVENTION

Recently, the integration of device components in a computer is getting denser and, therefore, the requirement to the components of the computer is that they have to be lighter, thinner, shorter and less power consumption. Comparing to the other display devices, such as cathode ray tube (CRT), the LCD is a small-sized device and has a low power consumption. In addiction to a liquid crystal screen, the LCD requires a light source because the liquid crystal is not a self-luminous substance.

Currently, lamps, such as CCLF (Cold Cathode Fluorescent Lamp) and HCFL (Hot Cathode Fluorescent Lamp), have been used as a light source for LCD. A back light unit which contains lamps as a major light source for LCD can be divided into two types, i.e., the direct-lighting type and the edge lighting type, according to the location of the lamp source. In the direct-lighting type, lamp light is uniformly distributed by a diffusing sheet and then emitted into the liquid crystal panel. On the other hand, lamp light of the edge lighting type transmits through a light guiding plate to form a planar light source FIG. 1 illustrates a conventional direct-lighting type back light unit. Lamps 10 are positioned in and surrounded by a lamp reflector 20 for reflecting the light emitted from the lamps 10 upward. An optical composition board constituted of a diffusing plate 50, a lower prism plate 60 and a upper prism plate 70 in sequence from the bottom to the top is mounted to the lamp reflector 20 for the transmission of the light from the lamps 10.

The diffusing plate 50 diffuses and uniformly distributes incident light to project uniform light intensity onto a liquid crystal panel (not shown). The lower and upper prism plates 60 and 70 convert the light travel path and are composed of a sequence of troughs in the shape of triangles or hemispheres. To protect the structured shape of the lower and upper prism plates 60 and 70, a protecting plate 80 is disposed on the upper prism plate 70. The liquid crystal panel is disposed on the protecting plate 80.

In the back light units as described above, the light emitted from the lamps 10 is reflected by the reflector 20, and then images on the display screen are formed by the light passing through the diffusing plate 50. The light transmitted through the diffusing plate 50 is directed toward perpendicularly to the liquid crystal panel with the light travel path converted to a selected angle by passing through the lower and the upper prism plates 60 and 70.

However, to enhance uniformity of light for the back light unit, there must be a certain space between the diffusing plate 50 and the lamps 10 for eliminating potential dark strips (as shown in FIG. 2) caused by the reduced intensity of light between adjacent lamps 10. Heretofore, a layer of particular ink 51 is printed on the diffusing plate 50 (as shown in FIG. 3) in order to further diffuse the light. The method solves the problems of dark strips and the likelihood of visual observation of the lamps by bare eyes. However, it suffers from increased thickness and decreased luminance due to the space exiting between the diffusing plate and light source. In addition, the ink itself absorbs energy of the light. Further, the ink may get aged, making back light unit become yellowish.

In order to overcome the defects mentioned above while minimizing the back light unit, there is a need for a back light unit that solves the above problems, such as poor uniformity, direct observation of the lamps, low luminance, increased thickness and the yellowish issue.

SUMMARY OF THE INVENTION

A primary object of the present invention is to provide a back light unit that allows for good uniformity, good luminance, and thin thickness without using printing ink.

It is another object of the present invention is to provide a reflector for a back light unit having curved reflecting surface to control the reflecting angle of the light, which enables the energy produced by the light source to be distributed uniformly to increase the uniformity of the display screen.

It is another object of the present invention to provide a reflector for a back light unit having a curved reflecting surface to control the reflecting angle of the light and to reduce the defect of the light energy absorbed between lamps, whereby the distance between the light source and the diffusing plate can be reduced to reduce the thickness of the back light unit, and the luminance of the display screen can be raised.

It is another object of the present invention to provide a reflector for a back light unit having a curved reflecting surface to control the reflecting angle of the light, which enables the energy produced by the light source to be distributed uniformly to meet the requirement of uniformity of the display screen without using printing ink.

It is another object of the present invention to provide a non-printed type guiding plate for a back light unit having a frosted layer made of a transparent material to enahce uniformity and the luminance of the display screen.

It is another object of the present invention to provide a non-printed type guiding plate for a back light unit which allows for omission of the conventional diffusing plate thereby reducing the thickness and weight of the back light unit.

According to the above mentioned objects, the present invention provides a direct-lighting type back light unit which comprises a plurality of light sources for emitting light outward; a reflecting plate defining a plurality of curved reflecting recesses in which the light sources are respectively arranged. Each recess comprises a first convex reflecting surface formed at a center of the recess and a second inclined reflecting surface formed at each edge of the recess and a third inclined reflecting surface extending from the second inclined reflecting surface.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE INVENTION

Some embodiments of the invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
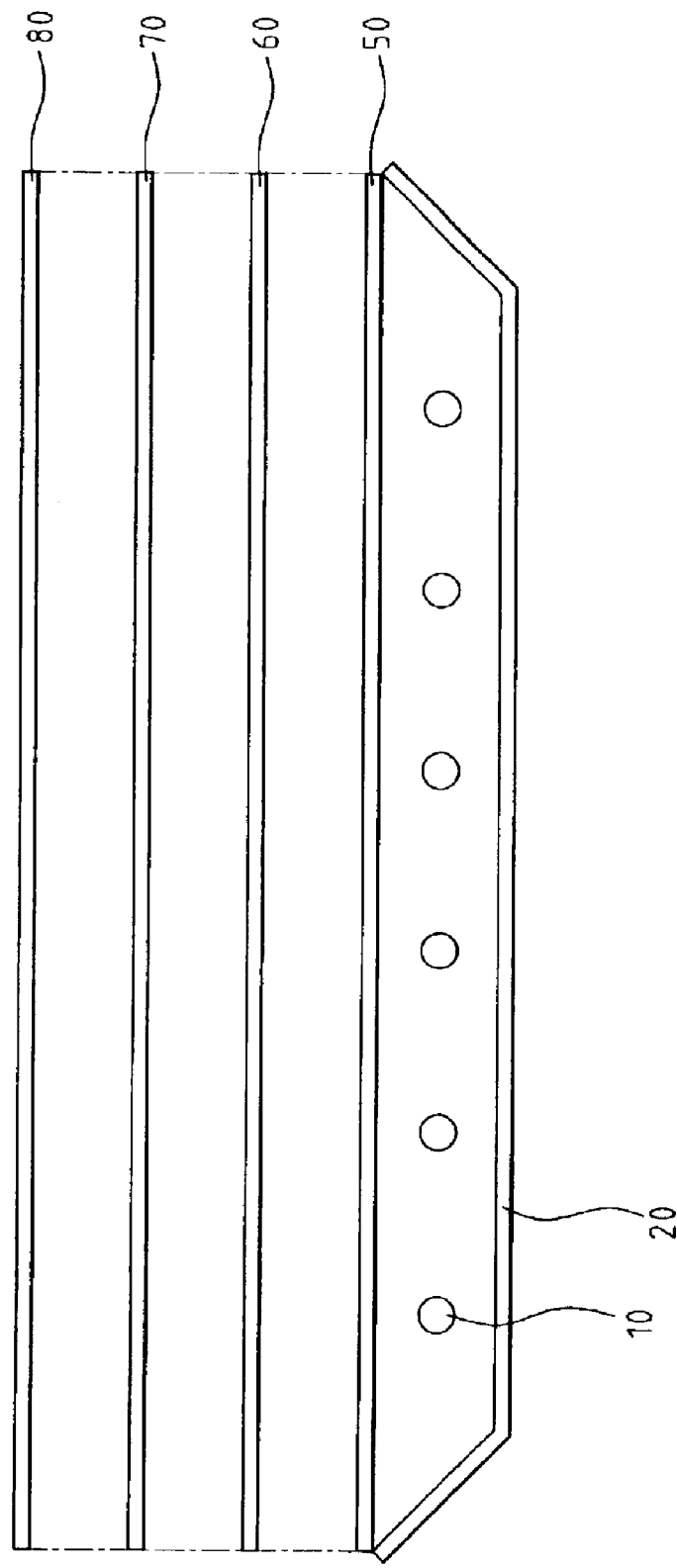
FIG. 1 is an exploded side elevational view of a conventional direct-lighting type back light unit.
Figure 2:
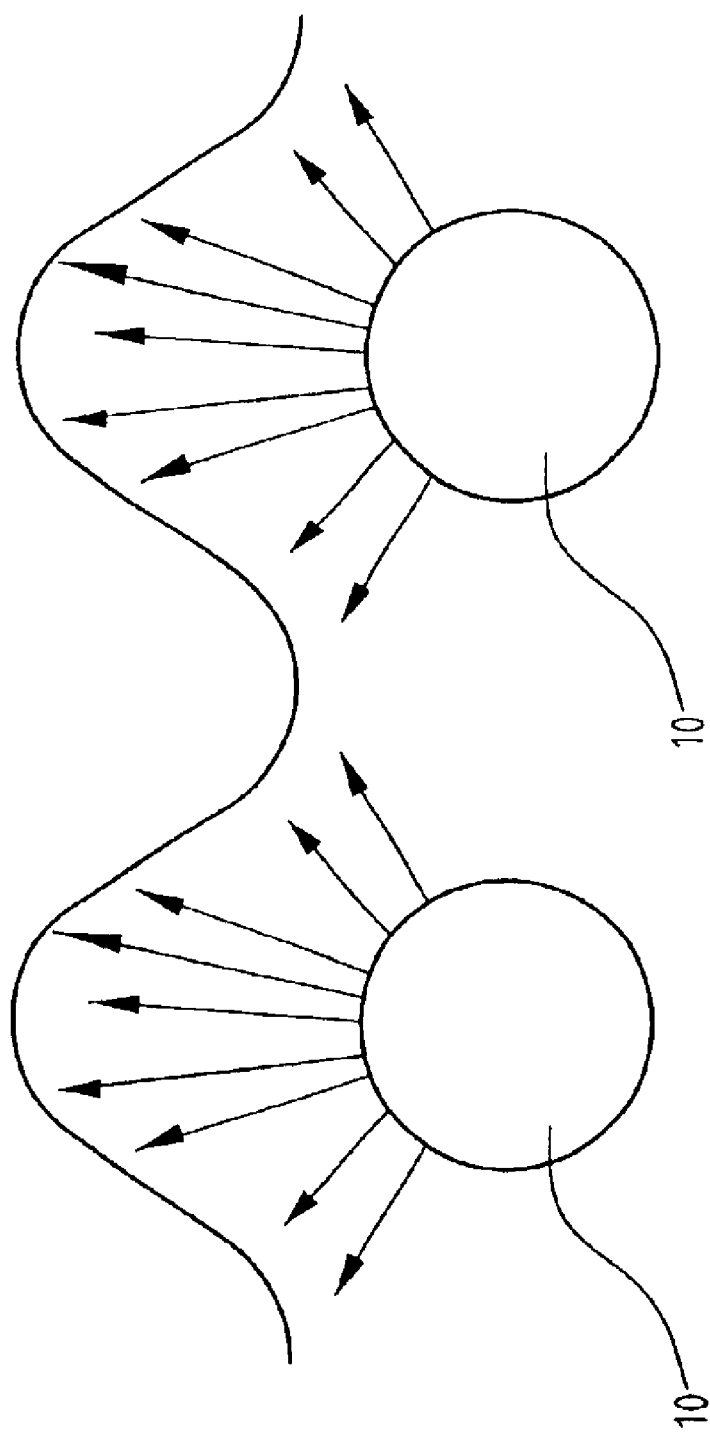
FIG. 2 is a sketch view showing distribution of light emitted from adjacent lamps.
Figure 3:
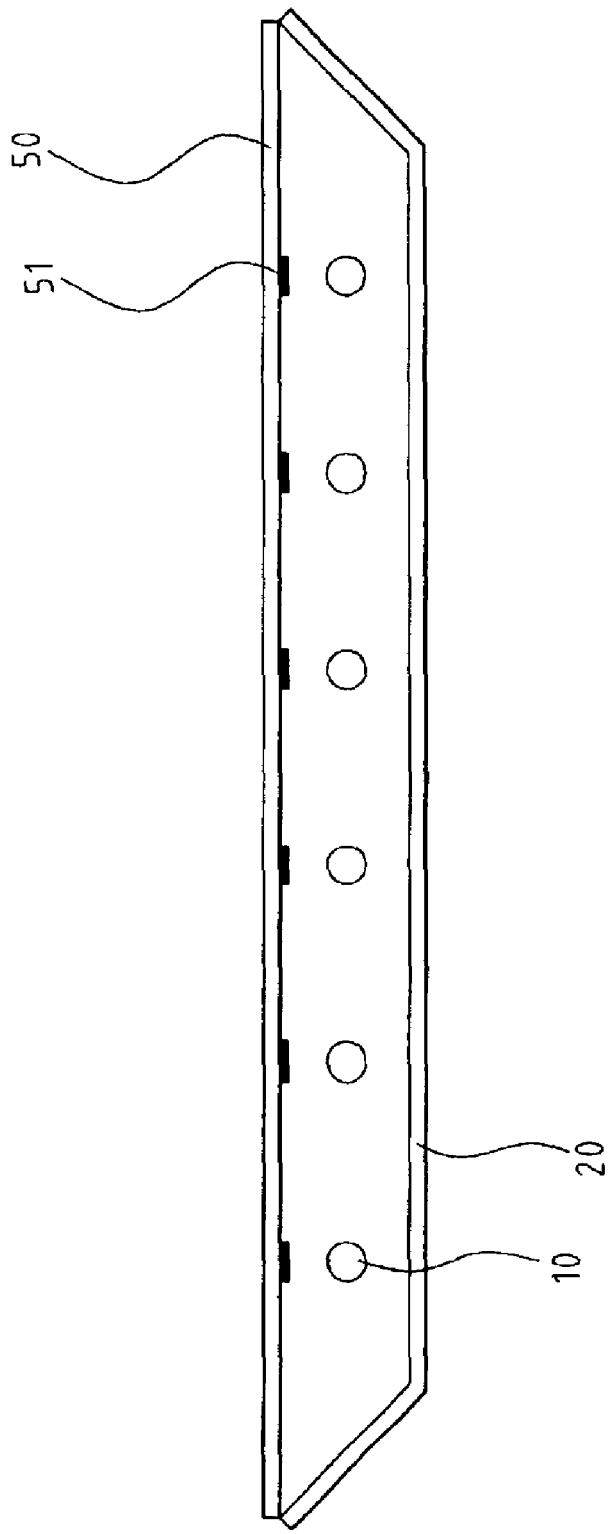
FIG. 3 is a side elevational view showing a conventional back light unit comprising a diffusing plate printing ink printed thereon.
Figure 4:
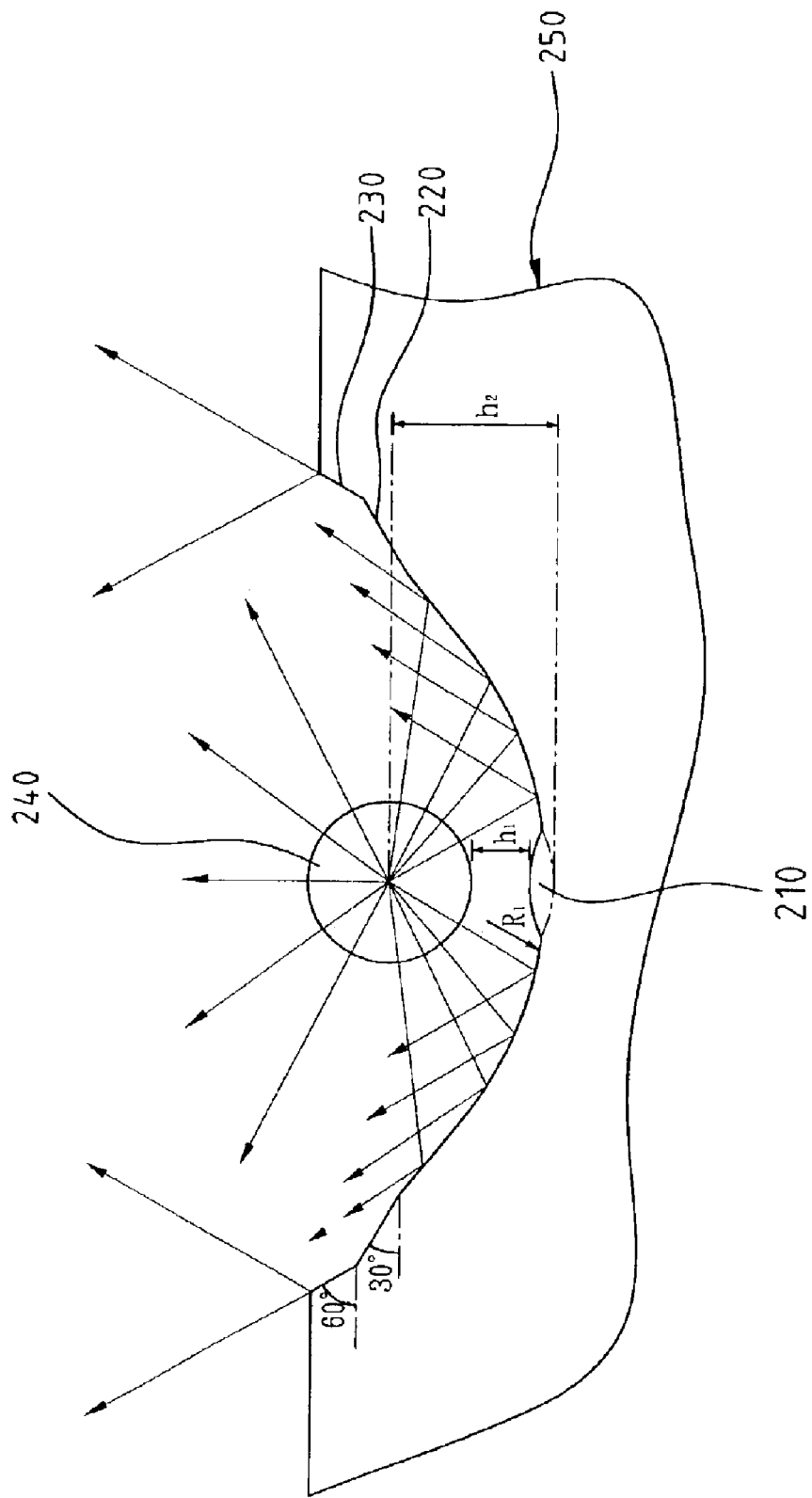
FIG. 4 is a schematic end view of a direct-lighting type back light unit constructed in accordance with a lust embodiment of the present invention.
Figure 5:
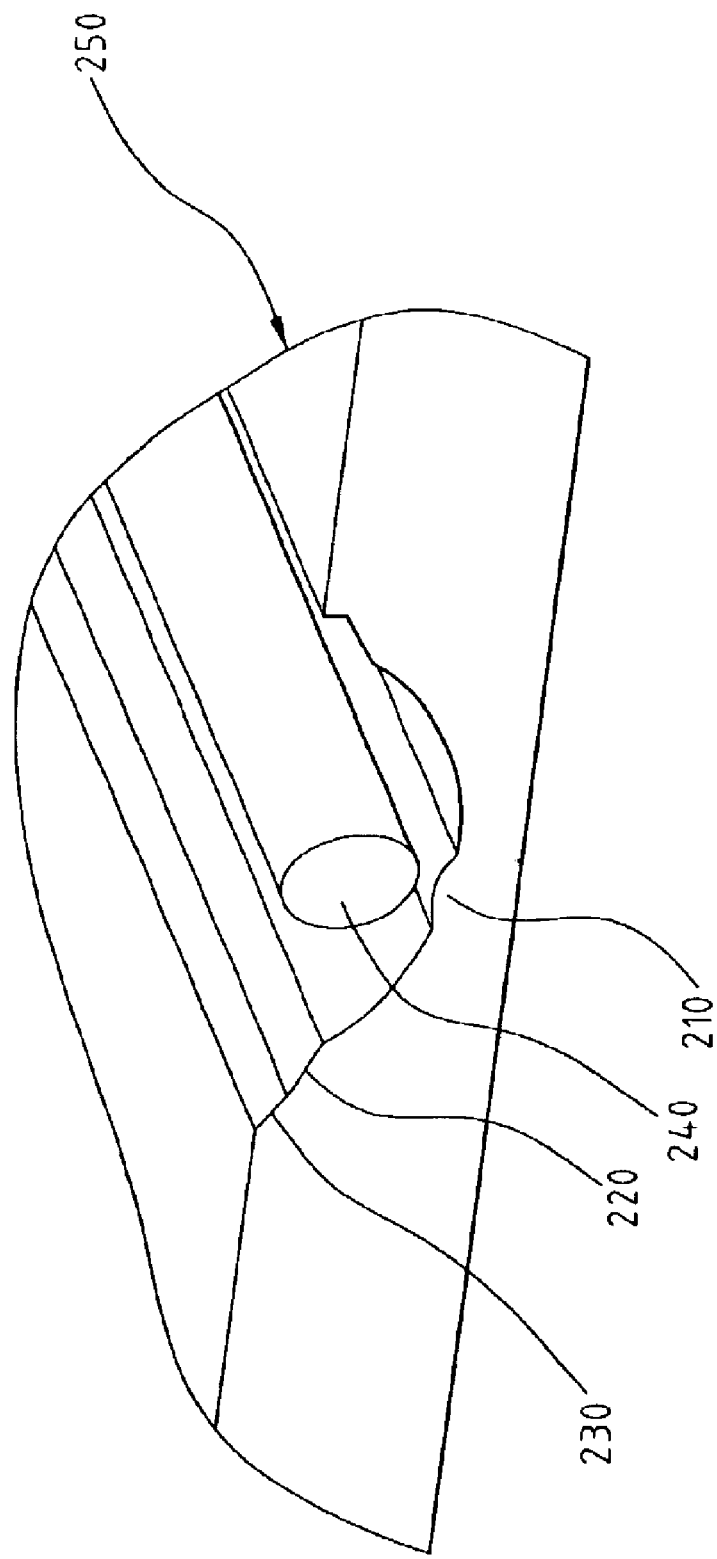
FIG. 5 is a perspective view of the direct-lighting type back light unit of the present invention shown in FIG. 4.
Figure 6:
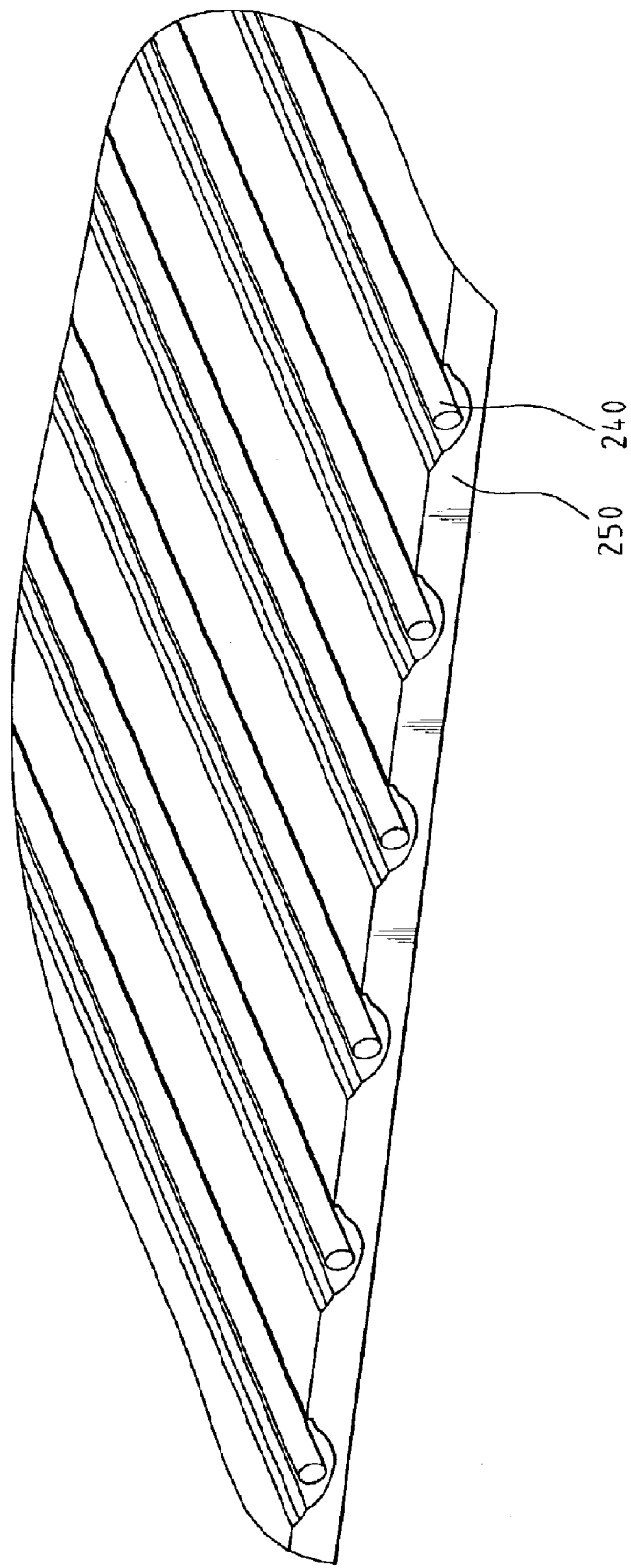
FIG. 6 is another perspective view showing the direct-lighting type back light unit of the present invention.

Referring to FIGS. 4–6, a light source 240 is disposed in a curved reflecting recess defined in a reflecting plate 250. The light source 240 may comprise a tubular lamp having a diameter Φ of about 2.6 mm. The reflecting recess partially surrounds the light source 240. A first, convex reflecting surface 210 is formed at a center part of the reflecting recess. The first surface 210 has a radius of curvature about 2–3 times of the diameter of the lamp 240 (namely Φ). The left edge part of the reflecting recess forms a second reflecting surface 220, which is inclined with respect to a horizontal surface and has an inclined angle from 20 to 40 degrees, preferably 30 degrees. A third, inclined reflecting surface 230 is formed next to and extends from the second surface 220. The third surface 230 has an inclined angle with respect to the horizontal surface of 40 to 70 degrees, preferably 60 degrees. The reflecting recess has a symmetrical configuration whereby the right edge part thereof forms second and third inclined surfaces which are not labeled in the drawings. The lamp 240 is arranged so that the distance, $h_1$, between the lowest point of the light source 240 and the highest point of the first reflecting surface 210 is smaller than one half of the lamp diameter Φ and greater than 1.0 mm. Namely, 1.0 mm<$h_1$<Φ/2. The distance, $h_2$, between the center of the lamp 240 and an imaginary bottom of die reflecting recess satisfies (Φ/2)+$h_1$≦$h_2$<(Φ/2)+2$h_1$. The radius of the curvature of the reflecting plate 250, $R_1$, is $R_1$>(Φ/2)+$h_1$. The radius of the curvature of the reflecting plate 250 can be varied as desired.

As can be seen from FIG. 4, the first convex reflecting surface 210 is a center bump surface protruded towards the light source 240. When the light source 240 emits light, the light travels exactly downward toward the first reflecting surface 210 is reflected by the first reflecting surface 210 in inclined directions away from and thereby not obstructed by the light source 240 itself. Other light goes downward to the reflecting surface 210 is reflected upward by the other part of the reflecting recess. It is noted that the second reflecting surface 220 and the third reflecting surface 230 formed on the edges of the reflecting recess of the present invention can reflect all the light which emits toward the edges of the reflecting recess toward the diffusing plate.

Figure 7:
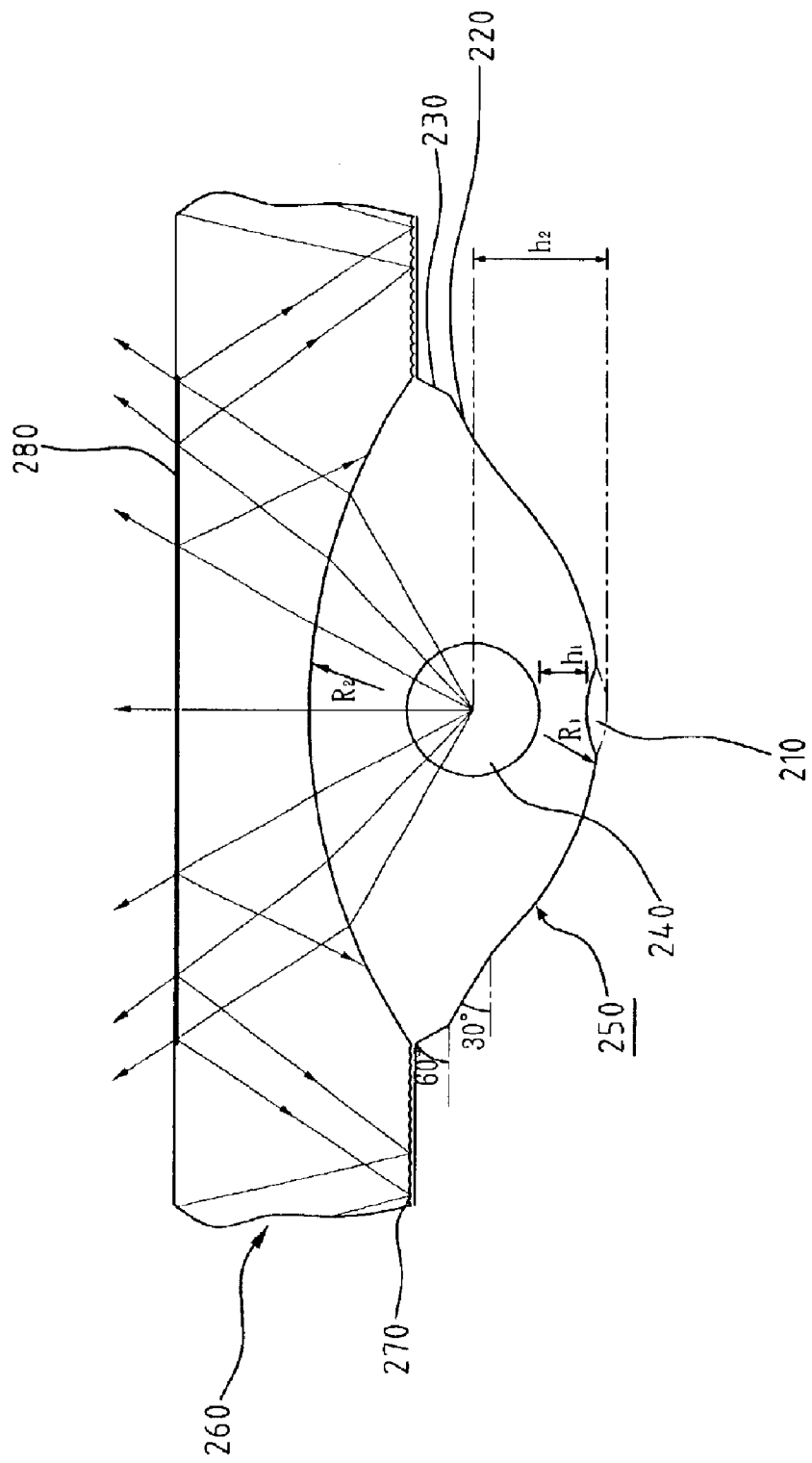
FIG. 7 is a schematic end view of a direct-lighting type back light constructed in accordance with a second embodiment of the present invention.
Figure 8:
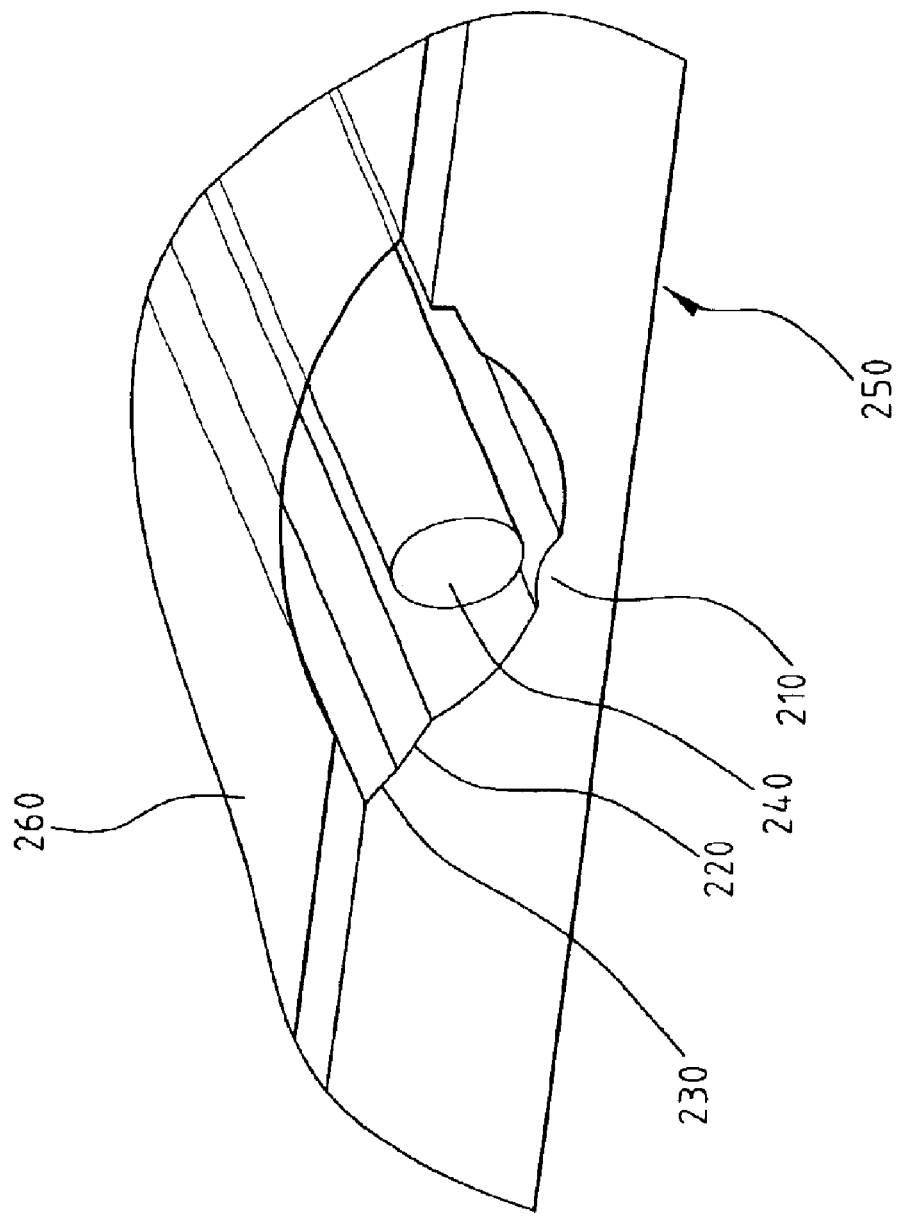
FIG. 8 is a perspective view of the direct-lighting type back light unit of the present invention.
Figure 9:
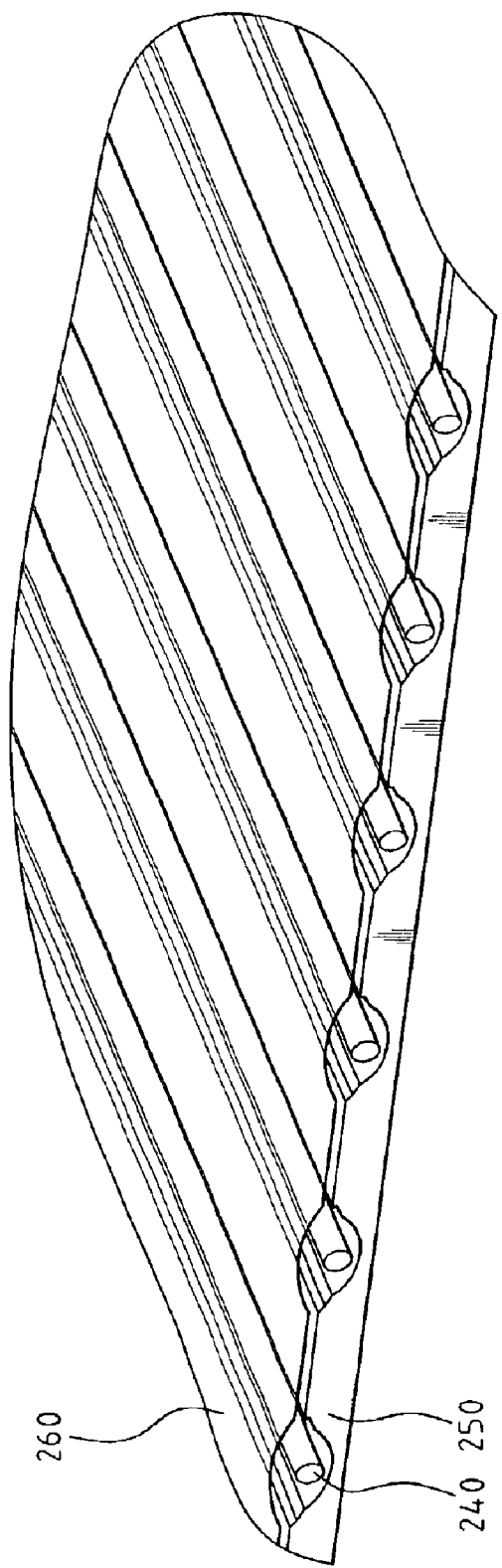
FIG. 9 is another perspective view showing the direct-lighting type back light unit of the present invention.

Referring to FIGS. 7–9, a second embodiment of the present invention which is a modification of the first embodiment illustrated in FIGS. 4–6 is shown, whereby the structure of the second embodiment is substantially identical to the first embodiment as shown in FIGS. 4 and 5. However, a non-printed light guiding plate 260 is arranged on the light source 240 for replacing the conventional diffusing plate. The light guiding plate 260 has a radius of curvature, $R_2$, substantially equal to the radius of curvature of the reflecting plate 250, that is $R_2 \approx R_1$. The non-printed light guiding plate 260 is composed of a transparent material such as acrylic material. The non-printed light guiding plate 260 defines a curved groove corresponding in position to the light source 240 for dispersing the light emitting toward the curved groove. The curved groove is substantially opposite to the reflecting recess of the reflecting plate 250 in spatial relationship. Thus, mounting the light guiding plate 260 to the reflecting plate 250 allows the light source 240 to be accommodated in a space formed by the curved recess and the curved groove. Further, each connecting portion between adjacent grooves forms a plurality of convex projections 270 for reflecting the partial refracting light generated by light penetrating the light guiding plate 260 upward. Moreover, frosted layers 280 are formed on the opposite side of the light guiding plate 260 for dispersing the light transmitting through the light guiding plate 260 for enhancing uniformity of light.

What is claimed is:

1. A back light unit comprising:
    a light source for emitting light; and
    a reflecting plate defining a curved reflecting recess having a center and opposite edges, a first reflecting surface having a convex configuration being formed at the center of the curved recess and a second reflecting surface inclined at a first angle and formed at each edge of the recess and a third reflecting surface inclined at a second angle and formed on each edge and extending from the second reflecting surface;
    wherein the first reflecting surface forms a spherical convex bump protruded from the curved reflecting recess and the light source is disposed above the convex bump.

2. The back light unit according to claim 1, wherein the light source comprises a tubular lamp having a diameter and wherein the recess of the reflecting plate has a radius of curvature that is greater than a first distance between a lowest point of the light source and a highest point of said first reflecting surface, plus one half of the diameter of the light source.

3. The back light unit according to claim 2, wherein the first reflecting surface has a radius of curvature that is two to three times of the diameter of the light source.

4. The back light unit according to claim 1, wherein the first angle of said second reflecting surface is from 20 to 40 degrees.

5. The back light unit according to claim 4, wherein the first angle is approximately 30 degrees.

6. The back light unit according to claim 1, wherein the second angle of said third reflecting surface is from 40 to 70 degrees.

7. The back light unit according to claim 6, wherein the second angle is approximately 60 degrees.

8. The back light unit according to claim 2, wherein a distance between the first reflecting surface and the light source is greater than 1.0 mm and smaller than one half of the diameter of the light source.

9. The back light unit according to claim 2, wherein a second distance between a center of the light source and an imaginary bottom of the recess is greater than one half of the diameter of the light source plus the first distance and smaller than one half of the diameter plus twice of the first distance.

10. A back light unit comprising:
a light source for emitting light;
a reflecting plate defining a curved reflecting recess having a center and opposite edges, a first reflecting surface having a convex configuration being formed at the center of the curved recess and a second reflecting surface inclined at a first angle and formed on each edge of the recess and a third reflecting surface inclined at a second angle and formed on each edge and extending from the second reflecting surface; and
a non-printed light guiding plate defining a curved groove facing the light source for diverging the light emitted thereto, the light guiding plate being disposed above the light source and mounted to the reflecting plate that is positioned below the light source so as to surround the light source between the light guiding plate and the reflecting plate;
wherein the first reflecting surface forms a convex bump protruded from the curved reflecting recess and the light source is disposed above the convex bump.

11. The back light unit according to claim 10, wherein the light source comprises a tubular lamp having a diameter and wherein the recess of the reflecting plate has a radius of curvature that is greater than a first distance between a lowest point of said light source to a highest point of said first reflecting surface, plus one half of the diameter of the light source.

12. The back light unit according to claim 11, wherein the first reflecting surface has a radius of curvature that is two to three times of the diameter of the light source.

13. The back light unit according to claim 10, wherein the first angle of said second reflecting surface is from 20 to 40 degrees.

14. The back light unit according to claim 13, wherein the first angle is approximately 30 degrees.

15. The back light unit according to claim 10, wherein the first angle of said third reflecting surface is from 40 to 70 degrees.

16. The back light unit according to claim 15, wherein the first angle is approximately 60 degrees.

17. The back light unit according to claim 11, wherein a distance between the first reflecting surface and the light source is greater than 1.0 mm and smaller than one half of the diameter of the light source.

18. The back light unit according to claim 11, wherein a second distance between a center of the light source and an imaginary bottom of the recess is greater than half the diameter of the light source plus the first distance and smaller than one half of the diameter plus twice of the first distance.

19. The back light unit according to claim 11, wherein the curved groove of the light guiding plate having a radius of curvature substantially equal to the radius of curvature of the curved recess.

20. The back light unit according to claim 10, comprising a plurality of light sources each accommodated in a space formed by a curved recess defined in the reflecting plate and a corresponding curved groove defined in the light guiding plate, the light guiding plate comprising a connection portion connecting between adjacent grooves, a plurality of convex projections being formed on the connection portion for reflecting light.

21. The back light unit according to claim 10, wherein frosted layers are formed on the light guiding plate.

* * * * *